(12) United States Patent
Oribe et al.

(10) Patent No.: US 10,933,560 B2
(45) Date of Patent: Mar. 2, 2021

(54) INTERMEDIATE MEMBER

(71) Applicant: NGK INSULATORS, LTD., Nagoya (JP)

(72) Inventors: Akinobu Oribe, Nagoya (JP);
Takahiro Tomita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/375,023

(22) Filed: Apr. 4, 2019

(65) Prior Publication Data

US 2019/0232526 A1    Aug. 1, 2019

Related U.S. Application Data

(63) Continuation of application No. PCT/JP2017/036645, filed on Oct. 10, 2017.

(30) Foreign Application Priority Data

Oct. 12, 2016  (JP) .............................. JP2016-201076

(51) Int. Cl.
*C04B 37/02* (2006.01)
*B28B 17/00* (2006.01)
(Continued)

(52) U.S. Cl.
CPC ........ B28B 17/0009 (2013.01); B28B 11/243 (2013.01); B28B 11/248 (2013.01); B32B 3/22 (2013.01); C04B 37/02 (2013.01)

(58) Field of Classification Search
CPC ..... B28B 17/0009; B32B 3/22; C04B 37/047; C04B 37/008; C04B 37/02; C04B 37/028;
(Continued)

(56) References Cited

U.S. PATENT DOCUMENTS 5,552,349 A * 9/1996 Ichii ........................ C01B 33/26
   501/118
2013/0266801 A1   10/2013 Sakamoto et al.

FOREIGN PATENT DOCUMENTS

JP  S61-173926 A1  8/1986
JP  H05-038565 A1  2/1993
(Continued)

OTHER PUBLICATIONS

International Preliminary Report on Patentability (Chapter I) (Application No. PCT/JP2017/036645) dated Apr. 25, 2019 (with English translation).

(Continued)

*Primary Examiner* — Daniel J. Schleis
*Assistant Examiner* — Kevin Ct Li
(74) *Attorney, Agent, or Firm* — Burr & Brown, PLLC

(57) ABSTRACT

An intermediate member is a member which is directly or indirectly sandwiched between a first object and a second object. The intermediate member includes a plate-like supporting member having a lower surface which is one main surface opposed to the first object and a plurality of ceramic blocks fixed on an upper surface which is the other main surface of the supporting member in a state of being separated from one another. Thus, in a state where the plurality of ceramic blocks are collectively held by the supporting member having relatively high shape retention, by disposing the intermediate member between the objects, it is possible to easily arrange the plurality of ceramic blocks between the objects with high positioning accuracy.

4 Claims, 4 Drawing Sheets

(51) Int. Cl.
*B28B 11/24* (2006.01)
*B32B 3/22* (2006.01)

(58) Field of Classification Search
CPC ........ C04B 2237/406; C04B 2237/407; C04B
2237/402; C04B 2237/403; C04B
2237/70; C04B 2237/348; C04B
2235/3418; C04B 2235/3225; C04B
2235/3227; C04B 2235/3232; C04B
2235/80; C04B 2235/77; C04B
2235/9607; C04B 35/481; C04B 35/486
See application file for complete search history.

(56) References Cited

FOREIGN PATENT DOCUMENTS

| | | | |
|---|---|---|---|
| JP | 2002-102627 A1 | | 4/2002 |
| JP | 2002102627 A | * | 4/2002 |
| JP | 2005-214372 A1 | | 8/2005 |
| JP | 2005214372 A | * | 8/2005 |
| JP | 4860005 B1 | | 1/2012 |
| JP | 2013-189996 A1 | | 9/2013 |
| JP | 2013189996 A | * | 9/2013 |

OTHER PUBLICATIONS

International Search Report and Written Opinion (Application No. PCT/JP2017/036645) dated Dec. 12, 2017.

* cited by examiner

INTERMEDIATE MEMBER

The present application is a continuation application of International Application No. PCT/JP2017/036645, filed Oct. 10, 2017, which claims priority to Japanese Patent Application No. 2016-201076, filed Oct. 12, 2016. The contents of these applications are incorporated herein by reference in their entirety.

TECHNICAL FIELD

The present invention relates to an intermediate member sandwiched between objects.

BACKGROUND ART

Techniques for using a porous material as a thermal insulation material have been conventionally proposed. Patent Publication No. 4860005 (Document 1), for example, proposes a thermal insulation material which includes metal oxide fine particles and a reinforcing fiber and has a crosslinked structure formed of some of the metal oxide fine particles which are eluted, between the metal oxide fine particles. In Example of Document 1, disclosed is a plate-like dry-pressed green body having a size of 150 mm×100 mm×thickness of 25 mm.

In a case where such a thermal insulation material as disclosed in Document 1 is disposed between objects, when large forces are exerted thereon from the objects, there is a possibility that the thermal insulation material may be broken. Further, in another case where a plurality of thermal insulation materials are disposed between objects having complicated shapes or the like, it is not easy to arrange the plurality of thermal insulation materials with high positioning accuracy.

Furthermore, as a thermal insulation member, for example, a material having a soft structure such as a fiber structure, a foam structure, or the like may be used. In such a soft structure, however, there is a possibility that the thermal insulation member cannot be stably held between the objects, depending on the environment.

SUMMARY OF INVENTION

The present invention is intended for an intermediate member sandwiched between objects, and it is an object of the present invention to easily arrange a plurality of ceramic blocks between the objects with high positioning accuracy.

The intermediate member according to the present invention is directly or indirectly sandwiched between a first object and a second object. The intermediate member includes a plate-like supporting member having one main surface opposed to the first object and a plurality of ceramic blocks fixed on the other main surface of the supporting member in a state of being separated from one another. With this intermediate member, it is possible to easily arrange the plurality of ceramic blocks between the objects with high positioning accuracy.

In one preferred embodiment of the present invention, the plurality of ceramic blocks include a porous ceramic block.

In another preferred embodiment of the present invention, the supporting member has flexibility.

In still another preferred embodiment of the present invention, the supporting member is formed of a metal.

In yet another preferred embodiment of the present invention, the plurality of ceramic blocks are adhered onto the supporting member with an adhesive agent, and the adhesive strength of the plurality of ceramic blocks to the supporting member is not lower than 0.1 MPa and not higher than 10 MPa.

In a further preferred embodiment of the present invention, the thickness of the plurality of ceramic blocks is not less than twice and not more than 100 times that of the supporting member.

In a still further preferred embodiment of the present invention, the thickness of the supporting member is not smaller than 0.02 mm and not larger than 3 mm.

In a yet further preferred embodiment of the present invention, the thickness of the plurality of ceramic blocks is not smaller than 0.04 mm and not larger than 300 mm.

In another further preferred embodiment of the present invention, the thermal conductivity of the plurality of ceramic blocks is not lower than 0.01 W/mK and not higher than 3.0 W/mK.

In still another further preferred embodiment of the present invention, the linear thermal expansion coefficient of the plurality of ceramic blocks is not lower than $1.0 \times 10^{-7}$/K and not higher than $1.2 \times 10^{-6}$/K.

In yet another further preferred embodiment of the present invention, the intermediate member further includes another plate-like supporting member. In another plate-like supporting member, one main surface is opposed to the second object and the plurality of ceramic blocks are fixed on the other main surface.

These and other objects, features, aspects and advantages of the present invention will become more apparent from the following detailed description of the present invention when taken in conjunction with the accompanying drawings.

DESCRIPTION OF EMBODIMENTS

Figure 1:
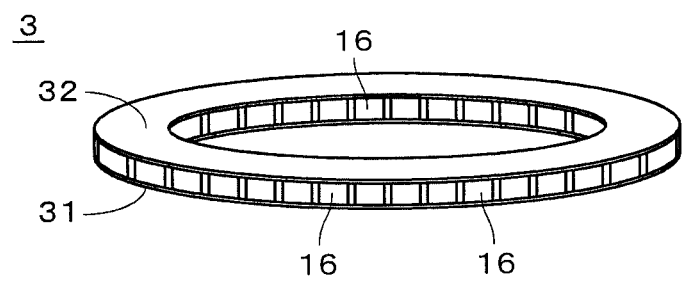
FIG. 1 is a perspective view showing a configuration of an intermediate member in accordance with one preferred embodiment.

FIG. 1 is a perspective view showing a configuration of an intermediate member 3 in accordance with one preferred embodiment of the present invention. The intermediate member 3 is a substantially plate-like member sandwiched between objects. The intermediate member 3 is used while being sandwiched between objects and, for example, suppresses or interrupts heat transfer between the objects. The intermediate member 3 has, for example, a substantially ring shape in a plan view. In the exemplary case shown in FIG. 1, the intermediate member 3 has a substantially annular shape in a plan view. In the following description, the upper side and the lower side in FIG. 1 will be referred to simply as an "upper side" and a "lower side", respectively. The up-and-down direction in FIG. 1 is irrelevant to an actual up-and-down direction in a case where the intermediate member 3 is used.

The intermediate member 3 includes two plate-like supporting members 31 and 32 and a plurality of ceramic blocks 16. The supporting member 32 is disposed above the supporting member 31, and opposed to the supporting member 31 in the up-and-down direction. The supporting members 31 and 32 have the same shape, and the whole supporting member 31 and the whole supporting member 32 overlap each other in the up-and-down direction in a plan view. In the exemplary case shown in FIG. 1, the supporting members 31 and 32 each have a substantially annular disk-like shape. The outer diameter of the intermediate member 3 is, for example, about 200 times the thickness of the intermediate member 3. In FIG. 1, the thickness of the intermediate member 3 is shown larger than an actual one.

The plurality of ceramic blocks 16 are disposed between the supporting member 31 and the supporting member 32, and adhered onto the supporting members 31 and 32 with, for example, an adhesive agent. In the present specification, the "adhesive agent" indicates a concept including not only a so-called adhesive agent but also a pressure sensitive adhesive, a (pressure sensitive) adhesive tape, or the like. Specifically, the adhesive agent means an agent which is interposed between two objects or present around a contact portion between two objects, to thereby fix the two objects to each other.

The supporting members 31 and 32 are thin plate-like members having flexibility. The supporting members 31 and 32 are each formed of a relatively hard material and have relatively high rigidity. In other words, the supporting members 31 and 32 each have high shape retention. The supporting members 31 and 32 are each formed of, for example, a metal. The supporting members 31 and 32 are each formed of, for example, stainless, iron, steel, copper, aluminum, titanium, or an alloy thereof. It is preferable that the thickness of each of the supporting members 31 and 32 should be not smaller than 0.02 mm and not larger than 3 mm. The thickness of each of the supporting members 31 and 32 is, for example, an average of thicknesses at portions with which the plurality of ceramic blocks 16 are in contact. In the following description, when it is intended to distinguish between the supporting member 31 and the supporting member 32, the supporting member 31 and the supporting member 32 will be referred to as a "first supporting member 31" and a "second supporting member 32", respectively.

Figure 2:
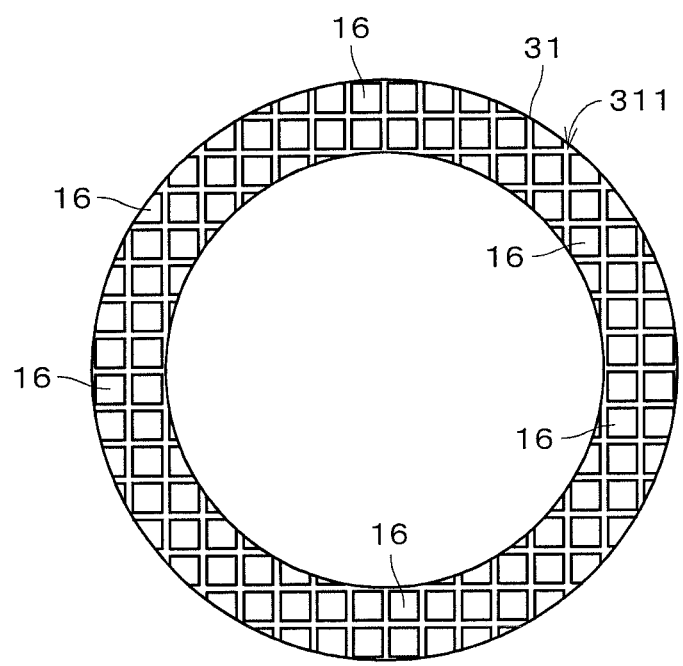
FIG. 2 is a plan view showing a first supporting member and a plurality of ceramic blocks.

FIG. 2 is a plan view showing the intermediate member 3 of FIG. 1 with the second supporting member 32 omitted. In other words, FIG. 2 is a plan view showing the first supporting member 31 and the plurality of ceramic blocks 16. The plurality of ceramic blocks 16 are fixed on an upper main surface (hereinafter, referred to as an "upper surface 311") of the first supporting member 31 in a state of being separated from one another. An outer peripheral edge and an inner peripheral edge of an area in which the plurality of ceramic blocks 16 are arranged substantially coincide with those of the first supporting member 31, respectively. Further, the outer peripheral edge and the inner peripheral edge of the area in which the plurality of ceramic blocks 16 are arranged also substantially coincide with those of the second supporting member 32 (see FIG. 1), respectively.

Each of the plurality of ceramic blocks 16 has, for example, a substantially plate-like shape or a substantially tile-like shape. Alternatively, each ceramic block 16 may have a relatively thick block-like shape. The number of ceramic blocks 16 included in the intermediate member 3 is not limited to an exemplary number shown in FIG. 2. In the exemplary case shown in FIG. 2, the ceramic blocks 16 disposed away from both the inner peripheral edge and the outer peripheral edge of the first supporting member 31 each have a rectangular shape having substantially the same size in a plan view. Respective shapes of the plurality of ceramic blocks 16 in a plan view, i.e., planar shapes may be different from one another. For example, the ceramic block 16 in contact with the inner peripheral edge or the outer peripheral edge of the first supporting member 31 has a shape obtained by subtracting a portion inside the inner peripheral edge of the first supporting member 31 in a radial direction or outside the outer peripheral edge of the first supporting member 31 in the radial direction, from the rectangular shape.

In the exemplary case shown in FIG. 2, the length of one side of each ceramic block 16, in a plan view, which is disposed away from both the inner peripheral edge and the outer peripheral edge of the first supporting member 31 is not shorter than 0.1 mm, and the upper limit is not restricted but is, for example, not longer than 10 mm. The length of one side is further preferably not shorter than 0.5 mm and not longer than 5 mm. As shown in FIG. 2, the plurality of ceramic blocks 16 are arranged in a matrix (in a so-called tile-like arrangement) on the first supporting member 31. The distance between adjacent ceramic blocks 16 is, for example, not smaller than 0.5 μm and not larger than 5 mm, and preferably not smaller than 0.5 μm and not larger than 50 μm.

In terms of thinning of the intermediate member 3, for example, the aspect ratio of each ceramic block 16 is preferably not less than 1, further preferably not less than 5, and more preferably not less than 7. Further, as described later, when particular attention is paid to the following characteristics of the ceramic blocks 16 with respect to deformation or the like of the first supporting member 31 and the second supporting member 32, it is preferable that the aspect ratio of each ceramic block 16 should be not more than 1. The aspect ratio of each ceramic block 16 refers to a ratio of the maximum length of one main surface to the thickness thereof. The one main surface is the widest plane among a plurality of planes forming the surface of the ceramic block 16. The one main surface is an upper surface or a lower surface of each ceramic block 16 in FIGS. 1 and 2. The maximum length of the main surface is the longest distance among distances each between a pair of parallel straight lines sandwiching an outer periphery of the main surface.

The thickness of each ceramic block 16 is preferably not smaller than 0.04 mm, and the upper limit is not restricted but is, for example, not larger than 300 mm. The thickness of each ceramic block 16 is further preferably not smaller than 0.5 mm and not larger than 5 mm. The thickness of each ceramic block 16 refers to, for example, a thickness at a center portion of the ceramic block 16 in a plan view. The thickness of each ceramic block 16 is preferably not less than twice and not more than 100 times that of each of the supporting members 31 and 32.

Figure 3:
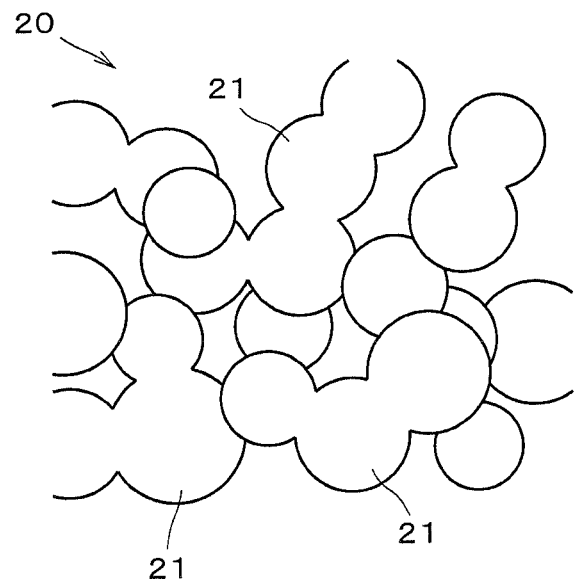
FIG. 3 is a schematic view showing a skeleton having a porous structure.

The plurality of ceramic blocks 16 described above include a porous ceramic block. Preferably, each of the ceramic blocks 16 is a porous ceramic block. In other words, each ceramic block 16 has a porous structure having pores. The porous structure has a skeleton having a mesh structure in which fine particles are three-dimensionally connected to one another, and voids other than the skeleton are pores. The fine particles are hereinafter referred to also as "skeleton particles". FIG. 3 is a schematic view showing a skeleton 20 of the ceramic block 16. In the exemplary case shown in FIG. 3, the skeleton particles forming the skeleton 20 are $ZrO_2$ particles 21. The particle diameter of the $ZrO_2$ particle 21 is preferably not smaller than 10 nm and not larger than 5 μm, and further preferably not smaller than 30 nm and not larger than 1 μm. It is thereby possible to suitably inhibit occurrence of lattice vibration (phonon) which is a main cause of thermal conduction and to reduce the thermal conductivity of the ceramic block 16. The $ZrO_2$ particle 21 may be a particle formed of one crystal grain (i.e., monocrystalline particle) or may be a particle formed of a multitude of crystal grains (i.e., polycrystalline particle).

Figure 4:
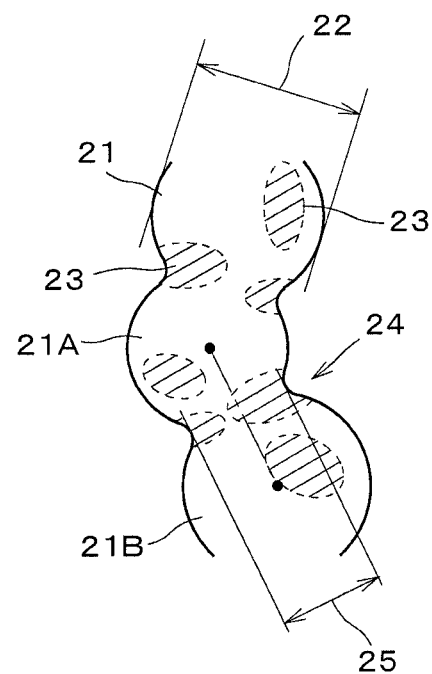
FIG. 4 is a view showing part of the skeleton, which is enlarged.

The particle diameter of the $ZrO_2$ particle 21 is obtained, for example, by measuring the size of one fine particle included in a group of skeleton particles forming the skeleton (for example, the diameter when the fine particle is spherical, or the maximum diameter when not spherical) from an image or the like obtained by observation using an electron microscope. The particle diameter of the $ZrO_2$ particle 21 is acquired, for example, by the following method. As shown in FIG. 4, in an image of a microstructure obtained by observation using a transmission electron microscope (TEM), a $ZrO_2$ particle 21 is specified. An image of the $ZrO_2$ particle 21 is almost a circle, and a maximum distance 22 between a pair of parallel lines sandwiching the particle image is acquired as the maximum diameter.

Assuming that the diameter of the $ZrO_2$ particle is thought as an average particle diameter, the average particle diameter is preferably not smaller than 10 nm and not larger than 1 μm, further preferably not smaller than 10 nm and not larger than 500 nm, and especially preferably not smaller than 10 nm and not larger than 100 nm. For obtaining the average particle diameter of the $ZrO_2$ particles 21, for example, first, the respective maximum diameters of ten or more $ZrO_2$ particles are acquired as the particle diameters from the TEM image by the above-described method. Next, an average value of the acquired maximum diameters is acquired as the average particle diameter of the $ZrO_2$ particles. In the $ZrO_2$ particle, another element (e.g., Mg, Ca, Y, Ce, Yb, Sc, or the like) may be solid-solved, and the $ZrO_2$ particle may be partially stabilized zirconia or fully stabilized zirconia.

In the exemplary case shown in FIG. 4, the skeleton having the porous structure is formed of the $ZrO_2$ particles 21 and different type material existing on surfaces of the $ZrO_2$ particles 21. In FIG. 4, areas 23 in which the different type material exists are conceptually indicated by parallel hatch lines. The different type material includes at least one selected out of $SiO_2$, $TiO_2$, $La_2O_3$, and $Y_2O_3$. Preferably, the different type material is at least one selected out of $SiO_2$, $TiO_2$, $La_2O_3$, and $Y_2O_3$. Such a porous structure has excellent thermal insulation performance. In the ceramic block 16, when the different type material exists on the surfaces of the $ZrO_2$ particles, since phonon scattering at grain boundaries between the $ZrO_2$ particles 21 and the different type material increases, it is possible to reduce the thermal conductivity.

Further, the concept that "the different type material exists on the surfaces of the $ZrO_2$ particles" includes a state in which the different type material is interposed between the $ZrO_2$ particles. Furthermore, the concept also includes another state in which the $ZrO_2$ particles are connected to one another at small contact points and the different type material exists around the connecting parts, i.e., around neck portions (constricted portions) formed by the connected $ZrO_2$ particles. Moreover, the different type material may exist in a state of being reacted with another material. For example, when the different type material is $SiO_2$, the different type material may exist not only in a form of $SiO_2$ but also as $ZrSiO_4$ formed by reacting with $ZrO_2$, as composite oxide formed by reacting with another different type material, or as an amorphous phase.

It is preferable that the different type material should exist between the $ZrO_2$ particles. Specifically, it is preferable that the different type material should be interposed between the $ZrO_2$ particles (in other words, the different type material should exist at grain boundaries between the $ZrO_2$ particles). When the different type material exists between the $ZrO_2$ particles, since phonon scattering at the grain boundaries between the $ZrO_2$ particles further increases, it is possible to further reduce the thermal conductivity.

It is also preferable that the different type material should be solid-solved in the $ZrO_2$ particles. When the different type material is solid-solved in the $ZrO_2$ particles, it is possible to further reduce the thermal conductivity. The concept that "the different type material is solid-solved in the $ZrO_2$ particles" means a state in which some of elements forming the different type material exist in crystal structures of the $ZrO_2$ particles. For example, the concept means that the Zr site in the crystal structure of the $ZrO_2$ particle is substituted with a metal atom of the different type material. Such a state can be confirmed by performing an elemental analysis using the TEM and a crystal structure analysis using X-ray diffraction.

In the skeleton, the minimum width in connecting parts between the $ZrO_2$ particles, i.e., the average of the widths of the neck portions, is preferably not lower than 40% and not higher than 100% of the average particle diameter of the $ZrO_2$ particles. It is thereby possible to ensure the strength of the ceramic block 16. Further, such ensuring of the strength is especially suitable for a case where compressive forces act on the ceramic block 16, as described later. The neck portion may be formed of only the $ZrO_2$ particles, or may include the different type material.

With reference to FIG. 4, an exemplary case of acquiring the width of the neck portion will be described. First, in the image of the microstructure obtained by observation using the TEM, a $ZrO_2$ particle 21 (represented by reference sign 21A in FIG. 4) and another $ZrO_2$ particle 21 (represented by reference sign 21B) adjacent to this particle are specified. As these particles, selected are ones aligned in a direction almost perpendicular to the line-of-sight direction. Since respective images of the $ZrO_2$ particles 21A and 21B are each almost a circle, a center of each of these particles can be acquired as a center of a circumscribed circle thereof. A pair of parallel lines which are parallel to a straight line connecting the two centers, which are tangent to a neck portion 24 formed by the $ZrO_2$ particles 21A and 21B, are acquired, and a distance 25 between the parallel lines is acquired as the width of the neck portion 24. The same process is performed on ten or more neck portions 24 each formed by adjacent $ZrO_2$ particles 21, and an average value is acquired as the average of the widths of the neck portions 24.

In the ceramic block 16, the volume of the different type material relative to the $ZrO_2$ particles is preferably not lower than 0.1 volume percentage and not higher than 30 volume percentage, further preferably not lower than 0.5 volume percentage and not higher than 20 volume percentage, and especially preferably not lower than 1 volume percentage and not higher than 18 volume percentage. By setting the volume within the above-described range, it is possible to give the neck portions appropriate widths while maintaining a skeleton structure and to suppress the thermal conductivity to be low while maintaining the mechanical strength of the ceramic block 16.

The above-described $ZrO_2$ particles forming the porous structure and the type of the different type material on the $ZrO_2$ particles can be checked by an elemental analysis using the transmission electron microscope (TEM), a scanning electron microscope (SEM), or a field emission scanning electron microscope (FE-SEM). Further, the volume of different type material relative to the $ZrO_2$ particles can be also obtained by using any one of these microscopes.

When there are two types of different type material, it is preferable that the value of volume ratio should be not smaller than one ninth and not larger than 9. When the above-described value of ratio is out of the above-described range, the effect of adding both the materials is sometimes reduced.

It is preferable that the average particle diameter of the particles of the above-described different type material at a raw material stage should be smaller than the average particle diameter of the $ZrO_2$ particles at a raw material stage. It is thereby possible to make it easy to maintain the properties of $ZrO_2$. In order to get an advantage in terms of manufacturing cost and material properties such as heat resistance, strength, and the like, the average particle diameter of the different type material at the raw material stage is preferably not smaller than 2 nm and not larger than 300 nm, further preferably not smaller than 2 nm and not larger than 100 nm, and especially preferably not smaller than 2 nm and not larger than 50 nm. The "average particle diameter of the different type material" is a value obtained by the same measurement as that of the average particle diameter of the $ZrO_2$ particles described above.

The raw material of the ceramic block 16 may contain any particles other than the $ZrO_2$ particles or the different type material particles. When the raw material contains any other particles, in order to get an advantage in terms of material properties such as heat resistance, strength, and the like, it is preferable that the total percentage of the $ZrO_2$ particles and the different type material particles contained in the raw material should be not lower than 90 volume percentage.

In the porous structure of the ceramic block 16, in order to get an advantage in terms of manufacturing cost and thermal conductivity, the average pore diameter is preferably not smaller than 0.5 nm and not larger than 500 nm, further preferably not smaller than 1 nm and not larger than 300 nm, and especially preferably not smaller than 10 nm and not larger than 100 nm. In the present specification, the "average pore diameter" is a value obtained by measurement using a mercury porosimeter (mercury press-in method). When the average pore diameter is not larger than 10 nm, the measurement is performed by the gas adsorption method.

The distribution of the pore diameters does not need to be uniform entirely in the ceramic block 16, but may be different depending on the position. In other words, the average pore diameter within a certain range may vary at different portions.

In order to get an advantage in terms of thermal conductivity and strength, the porosity of the porous structure of the ceramic block 16 is preferably not lower than 20% and not higher than 80%, and further preferably not lower than 20% and not higher than 70%. The porosity of the porous structure is more preferably not lower than 40% and not higher than 70%, and especially preferably not lower than 50% and not higher than 70%. Herein, in the present specification, the "porosity" is a value obtained by measurement using the mercury porosimeter (mercury press-in method). The pores may include closed pores. The shapes of the pores are not particularly limited but may be any one of various shapes.

The thermal conductivity of the ceramic block 16 is preferably not higher than 3.0 W/mK, and the lower limit is not restricted but usually not lower than 0.01 W/mK. The thermal conductivity of the ceramic block 16 is further preferably not lower than 0.01 W/mK and not higher than 1 W/mK. It is thereby possible to achieve an excellent thermal insulation effect. The "thermal conductivity" is a value obtained by the following calculation. First, the density of the ceramic block 16 is measured by the mercury porosimeter. Next, the specific heat of the ceramic block 16 is measured by using a differential scanning calorimeter (DSC). Subsequently, the thermal diffusivity of the ceramic block 16 is measured by a light-irradiation AC method. After that, from the equation of (thermal diffusivity)×(specific heat)×density=(thermal conductivity), the thermal conductivity of the ceramic block 16 is calculated.

The heat capacity of the ceramic block 16 is preferably not lower than 500 $kJ/m^3K$ and not higher than 2000 $kJ/m^3K$, and further preferably not lower than 500 $kJ/m^3K$ and not higher than 1500 $kJ/m^3K$. The linear thermal expansion coefficient of the ceramic block 16 is preferably not lower than $1.0\times10^{-7}$/K and not higher than $1.2\times10^{-6}$/K.

Next, an exemplary method of manufacturing the intermediate member 3 will be described. In the manufacturing method, the plurality of ceramic blocks 16 are formed by using tape casting. First, by adding and mixing a pore-forming material, a binder, a plasticizer, a solvent, and the like to powder of the constituent material of the ceramic block 16, a casting slurry is prepared.

The pore-forming material is not particularly limited only if the material will be extinguished to form a plurality of pores in the later sintering process. As the pore-forming material, for example, carbon black, latex particles, melamine resin particles, polymethyl methacrylate (PMMA) particles, polyethylene particles, polystyrene particles, a foaming resin, a water-absorbing resin, or the like can be used. Among these materials, preferable is carbon black which has a small particle size and easily forms small pores in a porous material.

As the binder, a polyvinyl butyral resin (PVB), a polyvinyl alcohol resin, a polyvinyl acetate resin, a poly acrylic resin, or the like can be used. As the plasticizer, dibutyl phthalate (DBP), dioctyl phthalate (DOP), or the like can be used. As the solvent, xylene, 1-butanol, or the like can be used.

The percentage of the $ZrO_2$ particles contained in the slurry is preferably not lower than 5 volume percentage and not higher than 20 volume percentage. The percentage of the different type material contained in the slurry is preferably not lower than 0.1 volume percentage and not higher than 5 volume percentage. The percentage of the pore-forming material contained in the slurry is preferably not lower than 0 volume percentage and not higher than 20 volume percentage. The percentage of the other components contained in the slurry is preferably not lower than 70 volume percentage and not higher than 90 volume percentage.

Subsequently, by performing a vacuum degassing process on the casting slurry, viscosity adjustment is performed. It is preferable that the viscosity of the slurry should be not lower than 0.1 Pa·s and not higher than 10 Pa·s.

In the tape casting, for example, the casting slurry is placed on a polyester film, and a green body is prepared by using a doctor blade and the like so that the thickness after sintering may become desired one. In the present preferred embodiment, the green body is processed to have a substantially annular disk-like shape. The green body is removed from the polyester film and collected.

By sintering the collected green body, a plate-like (in the present preferred embodiment, substantially annular disk-like) sintered body is formed. The sintering is preferably performed at not lower than 800° C. and not higher than 2000° C. for not shorter than 0.5 hours and not longer than 20 hours. The sintering is further preferably performed at not lower than 800° C. and not higher than 1800° C. for not shorter than 0.5 hours and not longer than 15 hours, and especially preferably performed at not lower than 800° C. and not higher than 1300° C. for not shorter than 0.5 hours and not longer than 10 hours.

Next, the plate-like sintered body is adhered onto a sheet in a removable state. The sheet is a member used during manufacture of the intermediate member 3, and represented by reference numeral 12 in FIG. 5. The sintered body is fixed on the sheet 12, for example, with adhesiveness of the sheet 12. The sheet 12 is, for example, a resin sheet or a resin film having adhesiveness. Further, before the sintered body is adhered onto the sheet 12, mirror finishing may be performed on a main surface of the sintered body.

After that, by dividing the sintered body on the sheet 12, a plurality of ceramic blocks 16 are obtained in a state of being adhered on the sheet 12. Since the sintered body is relatively firmly adhered on the sheet 12, it is possible to prevent the ceramic blocks 16 from being removed from the sheet 12 during division of the sintered body. The plurality of ceramic blocks 16 are arranged on the sheet 12 substantially annularly in a plan view. The plurality of ceramic blocks 16 are also referred to as a "block aggregate 14". Further, a structure in which the block aggregate 14 is removably fixed on the sheet 12 is referred to as an "aggregate sheet 10".

The adhesiveness (JIS Z0237) of the sheet 12 is preferably 1.0 N/10 mm or higher. The block aggregate 14 can be thereby firmly fixed on the sheet 12. The block aggregate 14 may be temporarily firmly fixed on the sheet 12 at an adhesion interface. The block aggregate 14 may be fixed on the sheet 12 through an adhesive agent or the like.

The above-described division of the sintered body may be performed by any one of various methods. By cutting (or cracking) the sintered body with an edge tool being pressed thereagainst, for example, the plurality of ceramic blocks 16 are formed. Alternatively, there may be a method in which grooves are formed by repeatedly pressing an edge tool against the sintered body with hands, by pressing a lattice-shaped cutting edge against the sintered body with a press or a rolling machine, or by using a laser beam machine, and the sintered body is cracked along the grooves. The cracking of the sintered body may be performed by using hands or a machine. The grooves may be formed by the same method as described above at any stage before the sintering. The sintered body may be cracked without providing any groove.

As another preferable exemplary method of manufacturing the plurality of ceramic blocks 16, a method using extrusion molding may be used. When the thickness of the green body is large, the extrusion molding is especially preferable. First, by adding and mixing a pore-forming material, a binder, a plasticizer, a solvent, and the like to powder of the constituent material of the ceramic block 16, a molding paste (body paste) is prepared. As the pore-forming material, the binder, the plasticizer, the solvent, and the like, appropriate ones for the extrusion molding are adopted.

Next, by extruding a paste from a mouthpiece provided with an elongated opening and relatively moving the mouthpiece along a support plate, the green body is formed continuously on the support plate. After drying, the green body is removed from the support plate and collected. By sintering the green body, the plate-like sintered body is formed. In principle, the sintering condition is the same as that in the tape casting but adjusted as appropriate as the need arises. After that, the sintered body is adhered on the sheet 12 and the division of the sintered body is performed by the above-described method. Further, for forming the green body, other various methods for manufacture of ceramic may be also used. For example, press molding, injection molding, casting, or the like may be used.

Figure 5:
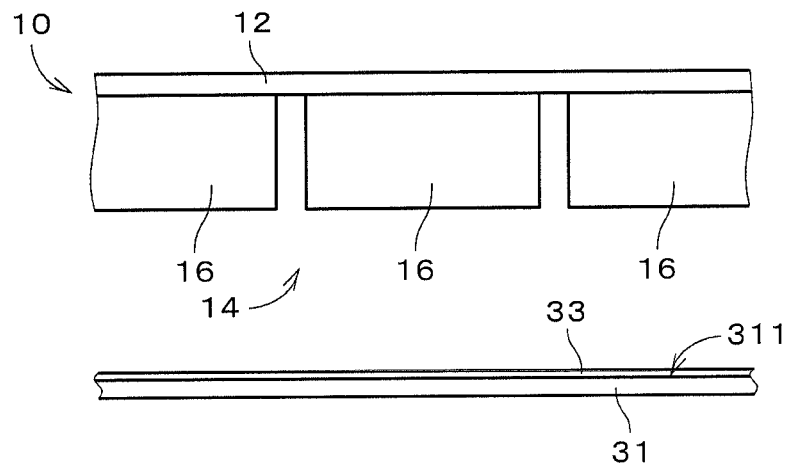
FIG. 5 is a side elevational view showing part of the intermediate member during manufacture.

As described above, after the aggregate sheet 10 is formed, as shown in a partially enlarged view of FIG. 5, in a state where the block aggregate 14 is opposed to the upper surface 311 of the first supporting member 31, the aggregate sheet 10 is disposed above the first supporting member 31. On the upper surface 311 of the first supporting member 31, a layer of adhesive agent 33 is formed in advance. As the adhesive agent 33, for example, used is an acrylic adhesive agent, a silicone adhesive agent, or an epoxy adhesive agent.

Figure 6:
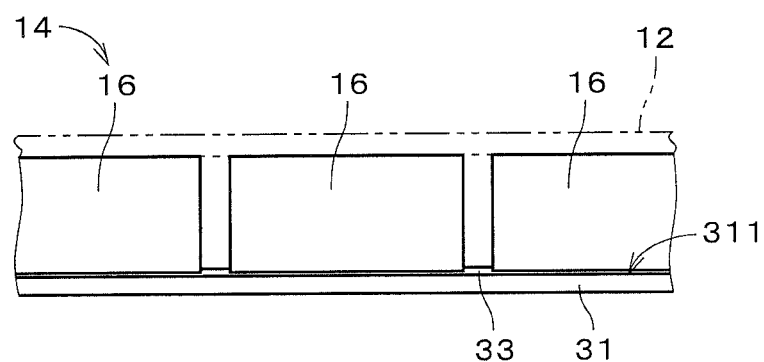
FIG. 6 is another side elevational view showing part of the intermediate member during manufacture.

Subsequently, as shown in FIG. 6, a lower surface of the block aggregate 14 (i.e., lower surfaces of the plurality of ceramic blocks 16) is brought into contact with the adhesive agent 33 on the first supporting member 31, and the block aggregate 14 is thereby adhered onto the upper surface 311 of the first supporting member 31. The ceramic blocks 16 and the first supporting member 31 are fixed to each other with relatively low adhesive strength. In other words, the ceramic blocks 16 are lightly fixed on the first supporting member 31. The adhesive strength of the plurality of ceramic blocks 16 to the first supporting member 31 is preferably not lower than 0.1 MPa and not higher than 10 MPa. The thickness of the adhesive agent 33 between the ceramic blocks 16 and the first supporting member 31 is, for example, not smaller than 0.001 mm and not larger than 0.5 mm. When the viscosity of the adhesive agent 33 is low, sometimes the ceramic blocks 16 and the first supporting member 31 are almost directly in contact with each other. Further, the thickness of the adhesive agent 33 on the first supporting member 31 between adjacent ceramic blocks 16 is, for example, not smaller than 0.05 mm and not larger than 2 mm. In the manufacture of the intermediate member 3, by handling a large number of ceramic blocks 16 in the state where the ceramic blocks 16 are fixed on the sheet 12, it is possible to easily arrange the ceramic blocks 16 at desired positions.

Next, the sheet 12 is removed from the block aggregate 14. The adhesiveness of the sheet 12 is reduced by applying heat, water, a solvent, electricity, light (including ultraviolet light), microwaves, an external force or the like to the sheet 12, by change over time, or the like. It is thereby possible to easily release the fixed state of the plurality of ceramic blocks 16 on the sheet 12 and remove the sheet 12 from the plurality of ceramic blocks 16. The adhesiveness of the sheet 12 at the time when the plurality of ceramic blocks 16 are removed is preferably 0.1 N/10 mm or lower. It is thereby possible to easily remove the plurality of ceramic blocks 16 from the sheet 12.

Figure 7:
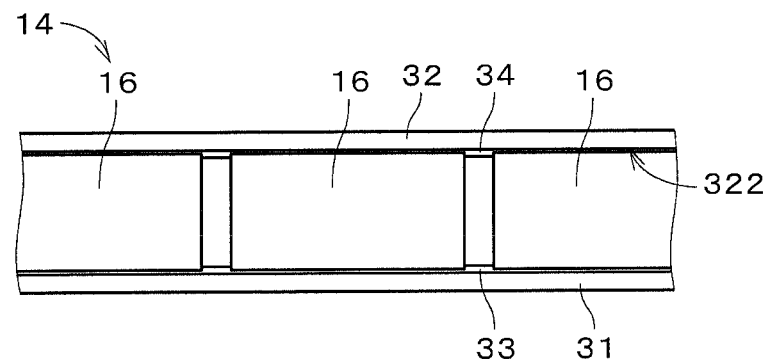
FIG. 7 is a side elevational view showing part of the intermediate member.

After that, in a state where a lower surface 322 shown in FIG. 7 is opposed to an upper surface of the block aggregate 14, the second supporting member 32 is disposed above the block aggregate 14. On the lower surface 322 of the second supporting member 32, a layer of adhesive agent 34 is formed in advance. As the adhesive agent 34, the same type of adhesive agent as the above-described adhesive agent 33 may be used, or any different type of adhesive agent may be used. Further, as the adhesive agent 33 or 34, any one of various types of adhesive agents may be used only if the supporting members 31 and 32 and the ceramic blocks 16 can be adhered to each other therewith.

Then, as shown in FIG. 7, the upper surface of the block aggregate 14 (i.e., upper surfaces of the plurality of ceramic blocks 16) is brought into contact with the adhesive agent 34 on the second supporting member 32, and the block aggregate 14 is thereby adhered onto the lower surface 322 of the second supporting member 32. The ceramic blocks 16 and the second supporting member 32 are fixed to each other with relatively low adhesive strength. In other words, the ceramic blocks 16 are lightly fixed on the second supporting member 32. The adhesive strength of the plurality of ceramic blocks 16 to the second supporting member 32 is preferably not lower than 0.1 MPa and not higher than 10 MPa. The adhesive strength of the plurality of ceramic blocks 16 to the second supporting member 32 may be equal to the adhesive strength to the first supporting member 31, or may be different therefrom. The thickness of the adhesive agent 34 between the ceramic blocks 16 and the second supporting member 32 is, for example, not smaller than 0.001 mm and not larger than 0.5 mm. When the viscosity of the adhesive agent 34 is low, sometimes the ceramic blocks 16 and the second supporting member 32 are almost directly in contact with each other. Further, the thickness of the adhesive agent 34 on the second supporting member 32 between adjacent ceramic blocks 16 is, for example, not smaller than 0.05 mm and not larger than 2 mm. The thickness of the adhesive agent 34 may be equal to that of the adhesive agent 33, or may be different therefrom.

After that, in the block aggregate 14, a portion extending off outward in the radial direction from the outer peripheral edges of the first supporting member 31 and the second supporting member 32 and another portion extending off inward in the radial direction from the inner peripheral edges of the first supporting member 31 and the second supporting member 32 are removed by polishing or the like, and the manufacture of the intermediate member 3 is completed. Further, the removal of the above-described portions extending off from peripheral edges may be performed before the adhesion of the second supporting member 32 to the block aggregate 14.

The above-described adhesive strength between the plurality of ceramic blocks 16 and the first supporting member 31 is a value measured by the following procedure with reference to "JIS K 5600-5-7". The same applies to the adhesive strength between the plurality of ceramic blocks 16 and the second supporting member 32. Further, measurement conditions or the like not described in the following description are the same as defined in "JIS K 5600-5-7".

Figure 8:
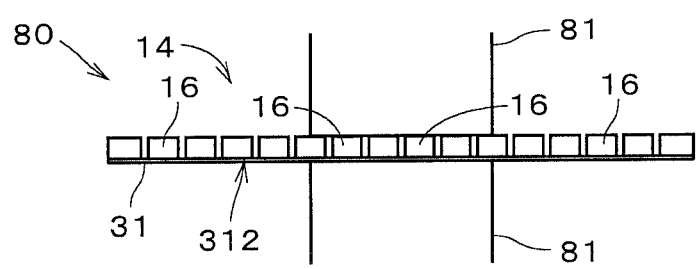
FIG. 8 is a side elevational view showing a measurement of adhesive strength.

In measurement of the adhesive strength, first, as shown in FIG. 8, a member (i.e., a structure indicated by the solid line in FIG. 6) in which the block aggregate 14 (i.e., the plurality of ceramic blocks 16) is fixed on the upper surface of the first supporting member 31 is prepared as a test member 80. The test member 80 is disposed between two test cylinders 81 arranged while being opposed to each other in the up-and-down direction of the figure. Respective central axes of the two test cylinders 81 are parallel with each other in the up-and-down direction and positioned collinearly. The diameter of each of the test cylinders 81 is 20 mm. A lower surface 312 of the first supporting member 31 of the test member 80 is fixed on an upper end surface of the lower test cylinder 81 with a test adhesive agent (not shown). Further, a lower end surface of the upper test cylinder 81 is fixed on the plurality of ceramic blocks 16 which overlap the lower end surface of this test cylinder 81 in the up-and-down direction, in the block aggregate 14 of the test member 80, with the test adhesive agent (not shown).

Subsequently, after the test adhesive agent is hardened, the two test cylinders 81 are pulled from both sides in a direction to be separated from each other in the up-and-down direction by using a tensile tester. In other words, the first supporting member 31 and the block aggregate 14 are pulled through the test cylinders 81 from both sides in a direction to be separated from each other in the up-and-down direction. Then, the tension (hereinafter, referred to as "destruction tension") to break an adhesive portion between the plurality of ceramic blocks 16 and the first supporting member 31 is measured. Further, a fracture surface between the plurality of ceramic blocks 16 and the first supporting member 31 is observed, and in the fracture surface, an adhesive area (hereinafter, referred to as a "destruction area") between the plurality of ceramic blocks 16 and the first supporting member 31 before the break is obtained by image analysis. By dividing the destruction tension (N) by the destruction area ($mm^2$), the above-described adhesive strength (i.e., peel adhesion strength) (MPa) is obtained. Further, even when the test member 80 is smaller than the end surface of the test cylinder 81, the adhesive strength can be obtained by the same procedure as described above.

Figure 9:
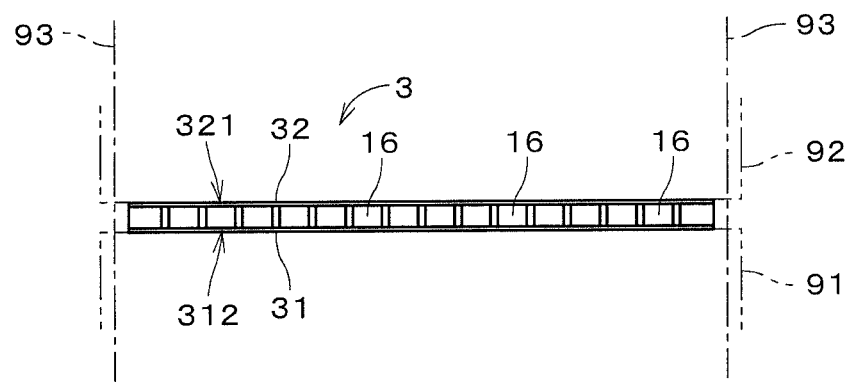
FIG. 9 is a view showing a state in which the intermediate member is arranged between a first object and a second object.

FIG. 9 is a view showing a state in which the intermediate member 3 is arranged between a first object 91 and a second object 92. One of the first object 91 and the second object 92 is a high-temperature portion and the other is a relatively low-temperature portion. The intermediate member 3 is directly sandwiched between the first object 91 and the second object 92. Alternatively, the intermediate member 3 may be indirectly sandwiched between the first object 91 and the second object 92. For example, between the intermediate member 3 and the first object 91 or the second object 92, any other member such as a sheet or the like may be interposed. In any case, the intermediate member 3 suppresses or interrupts heat transfer occurring between the first object 91 and the second object 92. In other words, the intermediate member 3 is a thermal insulation member for achieving thermal insulation between the first object 91 and the second object 92.

In the exemplary case shown in FIG. 9, the lower surface 312 of the first supporting member 31 of the intermediate member 3 is opposed to the first object 91 and directly or indirectly comes into contact with an upper surface of the first object 91. An upper surface 321 of the second supporting member 32 is opposed to the second object 92 and directly or indirectly comes into contact with a lower surface of the second object 92.

The first object 91 and the second object 92 are each a substance having rigidity enough to support the intermediate member 3 while sandwiching the intermediate member 3. The first object 91 and the second object 92 are each, for example, a metal, a resin, plastic, wood, ceramic, cement, concreate, pottery or porcelain material, glass, or the like. The first object 91 and the second object 92 may be formed of the same material or may be formed of different materials.

In the exemplary case shown in FIG. 9, the first object 91 and the second object 92 are given forces by bolts 93 which are fastening members in a direction to approach each other. In FIG. 9, for the bolts 93, only their centerlines are shown.

There may be another structure, for example, where the first object 91 and the intermediate member 3 are fixed to each other with an adhesive agent and the second object 92 and the intermediate member 3 are fixed to each other with the adhesive agent. The intermediate member 3 may be simply held while being sandwiched between the first object 91 and the second object 92 without using the adhesive agent or the like. The surface of the first object 91 which is opposed to the intermediate member 3 is not limited to a plane but may be a curved surface. The surface of the second object 92 which is opposed to the intermediate member 3 is not also limited to a plane but may be a curved surface.

Since the compressive strength of the intermediate member 3 is high, the intermediate member 3 is especially suitable for a case where the intermediate member 3 is used in a state where the intermediate member 3 is sandwiched between the first object 91 and the second object 92 and compressive forces act on the intermediate member 3 from the first object 91 and the second object 92. The compressive strength of the intermediate member 3 is preferably not lower than 10 MPa, and further preferably not lower than 50 MPa. Further, the compressive strength of the intermediate member 3 has no upper limit but is usually not higher than 1000 MPa.

Furthermore, in the case where the compressive forces act on the intermediate member 3 from the first object 91 and the second object 92, it is desirable that the change in position of the intermediate member 3 relative to the first object 91 and the second object 92 should be small. For this reason, the Young's modulus of the intermediate member 3 is preferably not lower than 2 GPa, and further preferably not lower than 5 GPa. The Young's modulus of the intermediate member 3 has no upper limit but is usually not higher than 300 GPa.

Further, the compressive forces do not always need to act on the intermediate member 3, and the intermediate member 3 may be sandwiched between the first object 91 and the second object 92 without any compressive force acting on the intermediate member 3. At that time, the intermediate member 3 may have not only a thermal insulation function but also a function as a structural member for supporting the second object 92 relative to the first object 91. Hereinafter, the first object 91 and the second object 92 between which the intermediate member 3 is disposed will be each referred to simply as an "object".

In the intermediate member 3, one of the first supporting member 31 and the second supporting member 32 may be omitted. When the second supporting member 32 is omitted, for example, the upper surface of the block aggregate 14 (i.e., the upper surfaces of the plurality of ceramic blocks 16) is opposed to the second object 92 and directly or indirectly comes into contact with the lower surface of the second object 92. Further, the lower surface 312 of the first supporting member 31 is opposed to the first object 91 and directly or indirectly comes into contact with the upper surface of the first object 91 like described above. In the intermediate member 3, the block aggregate 14 may be fixed on the upper surface 311 and the lower surface 312 of the first supporting member 31. In this case, the upper surface of the block aggregate 14 which is fixed on the upper surface 311 directly or indirectly comes into contact with the lower surface of the second object 92, and the lower surface of the block aggregate 14 which is fixed on the lower surface 312 directly or indirectly comes into contact with the upper surface of the first object 91.

In this case, the intermediate member 3 includes a plate-like supporting member 31 having a lower surface 312 which is one main surface opposed to the first object 91 and a plurality of ceramic blocks 16 fixed on an upper surface 311 which is the other main surface of the supporting member 31 in a state of being separated from one another. Thus, in a state where the plurality of ceramic blocks 16 are collectively held by the supporting member 31 having relatively high shape retention, by disposing the intermediate member 3 between the objects, it is possible to easily arrange the plurality of ceramic blocks 16 between the objects with high positioning accuracy.

Further, since the plurality of ceramic blocks 16 are separated from one another on the supporting member 31, even when the supporting member 31 is deformed when the intermediate member 3 is transported or attached to an object, the ceramic blocks 16 can be easily displaced in the vicinity of the deformed portion of the supporting member 31. Thus, since the ceramic blocks 16 can easily follow the deformation of the supporting member 31, it is possible to prevent or suppress removal and fall-off of the ceramic blocks 16 from the supporting member 31 due to the deformation of the first supporting member 31. Further, it is possible to prevent or suppress breakage of the ceramic blocks 16 due to the deformation of the supporting member 31.

In the exemplary case shown in FIG. 1, the intermediate member 3 further includes a second supporting member 32 which is another plate-like supporting member, in addition to the supporting member 31 (i.e., the first supporting member 31) and the plurality of ceramic blocks 16. An upper surface 321 (see FIG. 9) which is one main surface of the second supporting member 32 is opposed to the second object 92. On a lower surface 322 (see FIG. 7) which is the other main surface of the second supporting member 32, the plurality of ceramic blocks 16 are fixed. Thus, by sandwiching the plurality of ceramic blocks 16 between the first supporting member 31 and the second supporting member 32 to thereby fix the ceramic blocks 16, it is possible to suitably prevent or further suppress removal and fall-off of the ceramic blocks 16 from the first supporting member 31 and the second supporting member 32.

As described earlier, the plurality of ceramic blocks 16 include a porous ceramic block. It is thereby possible to suppress the thermal conductivity of the intermediate member 3 to be low. As a result, the intermediate member 3 can exhibit excellent thermal insulation performance between the objects. Further, when all the plurality of ceramic blocks 16 are porous ceramic blocks, the intermediate member 3 can exhibit further excellent thermal insulation performance between the objects.

In the porous ceramic block, the $ZrO_2$ particles and the different type material existing on surfaces of the $ZrO_2$ particles form the skeleton having the porous structure, and the different type material includes at least one selected out of $SiO_2$, $TiO_2$, $La_2O_3$, and $Y_2O_3$. The intermediate member 3 can thereby achieve mechanical strength high enough to be used while being sandwiched between the objects. Furthermore, the intermediate member 3 can exhibit further excellent thermal insulation performance between the objects. In the porous ceramic block, as described above, a lot of different type material exists on the surfaces of the $ZrO_2$ particles, especially at connecting parts between the particles. The intermediate member 3 can thereby have high mechanical strength and exhibit more excellent thermal insulation performance.

In the intermediate member 3, as described above, the ceramic blocks 16 can easily follow the deformation of the first supporting member 31 and the second supporting member 32. Therefore, the structure of the intermediate member 3 is especially suitable for a case where the first supporting member 31 has flexibility. Further, the structure of the intermediate member 3 is also especially suitable for another case where the second supporting member 32 has flexibility.

In the intermediate member 3, the first supporting member 31 has flexibility. For this reason, even in a case where the position of the outer peripheral edge or the inner peripheral edge of the intermediate member 3 is regulated by the object or the like case, by slightly bending the intermediate member 3, it is possible to facilitate attachment of the intermediate member 3 to the objects. Further, since the second supporting member 32 also has flexibility, it is possible to further facilitate the attachment of the intermediate member 3 to the objects. Furthermore, in the attachment of the intermediate member 3 to the objects, since the ceramic blocks 16 easily follow the above deflection of the first supporting member 31 and the second supporting member 32, it is possible to prevent or suppress fall-off and breakage of the ceramic blocks 16.

As described earlier, the first supporting member 31 is formed of a metal. Even when a relatively large force or high heat is applied to the intermediate member 3 after having been attached to the objects, it is possible to suitably maintain the shape of the intermediate member 3. Further, the second supporting member 32 is also formed of a metal. It is thereby possible to further suitably maintain the shape of the intermediate member 3.

In the intermediate member 3, the plurality of ceramic blocks 16 are adhered onto the first supporting member 31 with the adhesive agent 33. The adhesive strength of the plurality of ceramic blocks 16 to the first supporting member 31 is not lower than 0.1 MPa and not higher than 10 MPa. Since the adhesive strength is not lower than 0.1 MPa, it is possible to suitably prevent or suppress fall-off of the ceramic blocks 16 from the first supporting member 31. Since the adhesive strength is not higher than 10 MPa, when the first supporting member 31 is deformed, the ceramic blocks 16 can be partially removed or separated from the first supporting member 31 and easily follow the deformation of the first supporting member 31. Partial removal of the ceramic block 16 means that part of the lower surface of the ceramic block 16 moves upward away from the adhesive agent 33 on the first supporting member 31. Partial separation of the ceramic block 16 means that the adhesive agent 33 is deformed or the like in a state where part of the lower surface of the ceramic block 16 keeps in contact with the adhesive agent 33 and the distance between the part of the lower surface of the ceramic block 16 and the upper surface 311 of the first supporting member 31 in the up-and-down direction thereby becomes larger.

Further, in the intermediate member 3, the plurality of ceramic blocks 16 are adhered onto the second supporting member 32 with the adhesive agent 34. The adhesive strength of the plurality of ceramic blocks 16 to the second supporting member 32 is not lower than 0.1 MPa and not higher than 10 MPa. It is thereby possible to suitably prevent or suppress fall-off of the ceramic blocks 16 from the second supporting member 32, and when the second supporting member 32 is deformed, the ceramic blocks 16 can be partially removed or separated from the second supporting member 32 and easily follow the deformation of the second supporting member 32.

As described earlier, the thickness of the plurality of ceramic blocks 16 is preferably not smaller than 0.04 mm and not larger than 300 mm. It is thereby possible to prevent the intermediate member 3 from becoming excessively thicker while maintaining the mechanical strength of the plurality of ceramic blocks 16. Further, the thicknesses of the ceramic blocks 16 are substantially equal to one another in the block aggregate 14, and when the ceramic blocks 16 include some having different thicknesses, the thickness of the plurality of ceramic blocks 16 refers to an average of the thicknesses of the plurality of ceramic blocks 16.

In the intermediate member 3, the thickness of the first supporting member 31 is preferably not smaller than 0.02 mm and not larger than 3 mm. It is thereby possible to prevent the intermediate member 3 from becoming excessively thicker while maintaining the shape retention of the first supporting member 31. Further, the thickness of the second supporting member 32 is also preferably not smaller than 0.02 mm and not larger than 3 mm. It is thereby possible to prevent the intermediate member 3 from becoming excessively thicker while maintaining the shape retention of the second supporting member 32.

As described earlier, the thickness of the plurality of ceramic blocks 16 is preferably not less than twice and not more than 100 times that of the first supporting member 31. It is thereby possible to make the properties of the whole intermediate member 3 closer to those of the block aggregate 14 (i.e., the plurality of ceramic blocks 16). Specifically, it is possible to achieve low thermal conductivity and low thermal expansion of the intermediate member 3. Further, the thickness of the plurality of ceramic blocks 16 is preferably not less than twice and not more than 100 times that of the second supporting member 32. It is thereby possible to make the properties of the whole intermediate member 3 much closer to those of the block aggregate 14.

Furthermore, the low thermal conductivity and the low thermal expansion of the intermediate member 3 are achieved in the up-and-down direction (i.e., in a thickness direction of the intermediate member 3 in which the first supporting member 31, the ceramic blocks 16, and the second supporting member 32 are arranged in this order). On the other hand, neither the above-described low thermal conductivity nor the low thermal expansion cannot be achieved in a horizontal direction (i.e., in a direction perpendicular to the thickness direction) of the first supporting member 31 and the second supporting member 32. In other words, the intermediate member 3 has an anisotropy in the low thermal conductivity and the low thermal expansion.

The thermal conductivity of the plurality of ceramic blocks 16 is preferably not lower than 0.01 W/mK and not higher than 3.0 W/mK. It is thereby possible to suitably achieve low thermal conductivity of the intermediate member 3. Further, the linear thermal expansion coefficient of the plurality of ceramic blocks 16 is not lower than $1.0 \times 10^{-7}$/K and not higher than $1.2 \times 10^{-6}$/K. It is thereby possible to suitably achieve low thermal expansion of the intermediate member 3.

The above-described intermediate member 3 allows various variations.

For example, the plurality of ceramic blocks 16 may be fixed on the first supporting member 31 and the second supporting member 32 by any method other than adhesion using the adhesive agents 33 and 34.

The shape of the intermediate member 3 is not limited to the annular shape but may be changed into any one of various shapes. The first supporting member 31 and the second supporting member 32 may be members having different shapes, sizes, or the like. When the shape of the first supporting member 31 is different from that of the second supporting member 32, the plurality of ceramic blocks 16 are disposed, for example, in an area in which the first supporting member 31 and the second supporting member 32 overlap each other in a plan view. Further, since the ceramic blocks 16 have only to be fixed on at least one of the first supporting member 31 and the second supporting member 32, either one of the first supporting member 31 and the second supporting member 32 may be disposed in an area extending off from the other one in a plan view. Furthermore, it is preferable that the occupied area of the block aggregate 14 (i.e., the size of an area in which the block aggregate 14 is disposed, including clearances between the ceramic blocks 16 in a plan view) should be not less than 50% and not more than 99% of the area of each of the first supporting member 31 and the second supporting member 32 in a plan view.

The raw material of the ceramic blocks 16 does not always need to contain the $ZrO_2$ particles and the different type material but may be changed in various manners. For example, the ceramic blocks 16 are oxide of one element or a composite oxide of two or more elements, which are selected out of a group consisting of Zr, Y, Al, Si, Ti, Nb, Sr, La, Hf, Ce, Gd, Sm, Mn, Yb, Er, and Ta. A metal oxide has ion binding properties between the metal and oxygen stronger than those of a nonoxide of metal (for example, a carbide or a nitride). For this reason, since the ceramic blocks 16 contain metal oxide, the thermal conductivity of the ceramic blocks 16 becomes lower.

The plurality of ceramic blocks 16 may include both a porous ceramic block and a dense ceramic block (specifically, which includes almost no pore). In this case, it is preferable that the total area of the porous ceramic blocks in a plan view should be larger than that of the dense ceramic blocks in a plan view. Further, the plurality of ceramic blocks 16 may consist of only the dense ceramic blocks.

The first supporting member 31 and the second supporting member 32 may be each formed of any of various materials (for example, ceramic, glass, wood, a resin, composite material of a resin and fiber material, or the like) other than metals.

The method of manufacturing the ceramic blocks 16 and the method of manufacturing the intermediate member 3 are not limited to the above-described methods but may be changed in various manners.

The intermediate member 3 may be used for the purpose of thermal insulation between the objects, or instead of being used for the purpose of thermal insulation between the objects, may be used while being sandwiched between the objects for other purposes.

The configurations in the above-discussed preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

REFERENCE SIGNS LIST

3 Intermediate member
16 Ceramic block
31 First supporting member
32 Second supporting member
33, 34 Adhesive agent
91 First object
92 Second object
311 Upper surface (of first supporting member)
312 Lower surface (of first supporting member)
321 Upper surface (of second supporting member)
322 Lower surface (of second supporting member)

The invention claimed is:

1. An intermediate member which is sandwiched between a first object and a second object, comprising:
    a plate-like supporting member having two main surfaces, with a first main surface opposed to said first object; and
    a plurality of ceramic blocks fixed on a second main surface of said supporting member in a state of being separated from one another,
    wherein a porosity of said plurality of said ceramic blocks is not lower than 20% and not higher than 80%,
    said supporting member is formed of a metal,
    said supporting member has a thickness that is not smaller that 0.02 mm and not larger than 3 mm,
    said plurality of ceramic blocks are adhered onto said supporting member with an adhesive agent, and
    an adhesive strength between said plurality of ceramic blocks to said supporting member is not lower than 0.1 MPa and not higher than 10 MPa.

2. The intermediate member according to claim 1, wherein
    said plurality of ceramic blocks have a thickness that is not less than twice and not more than 100 times that of said supporting member.

3. The intermediate member according to claim 1, wherein
    said plurality of ceramic blocks have a thickness that is not smaller than 0.04 mm and not larger than 300 mm.

4. The intermediate member according to claim 1, further comprising:
    another plate-like supporting member which includes two main surfaces, with a first main surface that is opposed to said second object and said plurality of ceramic blocks are fixed on a second main surface.

* * * * *